(12) United States Patent
Corazza et al.

(10) Patent No.: US 11,170,558 B2
(45) Date of Patent: *Nov. 9, 2021

(54) AUTOMATIC RIGGING OF THREE DIMENSIONAL CHARACTERS FOR ANIMATION

(71) Applicant: Adobe Inc., San Jose, CA (US)

(72) Inventors: Stefano Corazza, San Francisco, CA (US); Emiliano Gambaretto, San Francisco, CA (US); Prasanna Vasudevan, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,774

(22) Filed: Jul. 2, 2020

(65) Prior Publication Data

US 2020/0334892 A1 Oct. 22, 2020

Related U.S. Application Data

(63) Continuation of application No. 13/681,120, filed on Nov. 19, 2012, now Pat. No. 10,748,325.

(60) Provisional application No. 61/561,228, filed on Nov. 17, 2011.

(51) Int. Cl.
  *G06T 15/08* (2011.01)
  *G06T 13/40* (2011.01)
  *G06T 17/20* (2006.01)
  *G06T 19/00* (2011.01)

(52) U.S. Cl.
  CPC .............. *G06T 15/08* (2013.01); *G06T 13/40* (2013.01); *G06T 17/20* (2013.01); *G06T 19/00* (2013.01)

(58) Field of Classification Search
  None
  See application file for complete search history.

(56) References Cited

U.S. PATENT DOCUMENTS

| | | | |
|---|---|---|---|
| 6,047,078 | A | 4/2000 | Kang |
| 6,088,042 | A | 7/2000 | Handelman et al. |
| 6,278,466 | B1 | 8/2001 | Chen |
| 6,466,215 | B1 | 10/2002 | Matsuda et al. |
| 6,535,215 | B1 | 3/2003 | DeWitt et al. |

(Continued)

FOREIGN PATENT DOCUMENTS

| | | |
|---|---|---|
| EP | 1884896 | 2/2008 |
| WO | WO 2007/132451 | 11/2007 |

(Continued)

OTHER PUBLICATIONS

International Search Report for International Application No. PCT/US09/57155, date completed Dec. 22, 2009, dated Jan. 12, 2010, 5 pgs.

(Continued)

*Primary Examiner* — Saptarshi Mazumder
(74) *Attorney, Agent, or Firm* — Keller Jolley Preece

(57) ABSTRACT

A system and method for automatic rigging of three dimensional characters for facial animation provide a rigged mesh for an original three dimensional mesh. A representative mesh is generated from the original mesh. Segments, key points, a bone set, and skinning weights are then determined for the representative mesh. The Skinning weights and bone set are placed in the original mesh to generate the rigged mesh.

20 Claims, 13 Drawing Sheets

(56) References Cited

U.S. PATENT DOCUMENTS

| | | |
|---|---|---|
| 6,552,729 B1 | 4/2003 | Di Bernardo et al. |
| 6,554,706 B2 | 4/2003 | Kim et al. |
| 6,700,586 B1 | 3/2004 | Demers |
| 6,714,200 B1 | 3/2004 | Talnykin et al. |
| 7,149,330 B2 | 12/2006 | Liu et al. |
| 7,168,953 B1 | 1/2007 | Poggio et al. |
| 7,209,139 B1 | 4/2007 | Keet et al. |
| 7,372,536 B2 | 5/2008 | Shah et al. |
| 7,522,165 B2 | 4/2009 | Weaver |
| 7,937,253 B2 | 5/2011 | Anast et al. |
| 8,390,628 B2 | 3/2013 | Harding et al. |
| 8,704,832 B2 | 4/2014 | Taylor et al. |
| 8,744,121 B2 | 6/2014 | Polzin et al. |
| 8,749,556 B2 | 6/2014 | de Aguiar et al. |
| 8,797,328 B2 | 8/2014 | Corazza et al. |
| 8,928,672 B2 | 1/2015 | Corazza et al. |
| 8,982,122 B2 | 3/2015 | Corazza et al. |
| 9,626,788 B2 | 4/2017 | Corazza |
| 9,747,495 B2 | 8/2017 | Corazza et al. |
| 2001/0000779 A1 | 5/2001 | Hayama et al. |
| 2002/0050988 A1 | 5/2002 | Petrov et al. |
| 2002/0102024 A1 | 8/2002 | Jones et al. |
| 2003/0164829 A1 | 9/2003 | Bregler et al. |
| 2003/0169907 A1 | 9/2003 | Edwards et al. |
| 2003/0208116 A1 | 11/2003 | Liang et al. |
| 2003/0215130 A1 | 11/2003 | Nakamura et al. |
| 2004/0021660 A1 | 2/2004 | Ng-Thow-Hing et al. |
| 2004/0049309 A1 | 3/2004 | Gardner et al. |
| 2004/0210427 A1 | 10/2004 | Marschner et al. |
| 2004/0227752 A1 | 11/2004 | McCartha et al. |
| 2005/0264572 A1 | 12/2005 | Anast et al. |
| 2006/0002631 A1 | 1/2006 | Fu et al. |
| 2006/0109274 A1 | 5/2006 | Alvarez et al. |
| 2006/0134585 A1 | 6/2006 | Adamo-villani et al. |
| 2006/0171590 A1 | 8/2006 | Lu et al. |
| 2006/0245618 A1 | 11/2006 | Boregowda et al. |
| 2006/0267978 A1 | 11/2006 | Litke et al. |
| 2007/0091085 A1 | 4/2007 | Wang et al. |
| 2007/0104351 A1 | 5/2007 | Yang et al. |
| 2007/0167779 A1 | 7/2007 | Kim et al. |
| 2007/0182736 A1 | 8/2007 | Weaver |
| 2008/0024487 A1 | 1/2008 | Isner et al. |
| 2008/0030497 A1 | 2/2008 | Hu et al. |
| 2008/0031512 A1 | 2/2008 | Mundermann et al. |
| 2008/0043021 A1 | 2/2008 | Huang et al. |
| 2008/0152213 A1 | 6/2008 | Medioni et al. |
| 2008/0158224 A1 | 7/2008 | Wong et al. |
| 2008/0170077 A1 | 7/2008 | Sullivan et al. |
| 2008/0170078 A1 | 7/2008 | Sullivan et al. |
| 2008/0180448 A1 | 7/2008 | Anguelov et al. |
| 2008/0187246 A1 | 8/2008 | Andres Del Valle |
| 2008/0252596 A1 | 10/2008 | Bell et al. |
| 2008/0284779 A1 | 11/2008 | Gu et al. |
| 2009/0027337 A1 | 1/2009 | Hildreth |
| 2009/0067730 A1 | 3/2009 | Schneiderman |
| 2009/0195544 A1 | 8/2009 | Wrinch |
| 2009/0196466 A1 | 8/2009 | Capata et al. |
| 2009/0202114 A1 | 8/2009 | Morin et al. |
| 2009/0202144 A1 | 8/2009 | Taub et al. |
| 2009/0231347 A1 | 9/2009 | Omote |
| 2010/0007665 A1 | 1/2010 | Smith et al. |
| 2010/0020073 A1* | 1/2010 | Corazza .................. G06T 17/10 345/420 |
| 2010/0073361 A1 | 3/2010 | Taylor et al. |
| 2010/0134490 A1 | 6/2010 | Corazza et al. |
| 2010/0141662 A1 | 6/2010 | Storey et al. |
| 2010/0149179 A1 | 6/2010 | de Aguiar et al. |
| 2010/0203968 A1 | 8/2010 | Gill et al. |
| 2010/0235045 A1 | 9/2010 | Craig et al. |
| 2010/0238182 A1 | 9/2010 | Geisner et al. |
| 2010/0253703 A1 | 10/2010 | Ostermann |
| 2010/0259547 A1 | 10/2010 | de Aguiar et al. |
| 2010/0271366 A1 | 10/2010 | Sung et al. |
| 2010/0278405 A1 | 11/2010 | Kakadiaris et al. |
| 2010/0285877 A1 | 11/2010 | Corazza |
| 2011/0211729 A1* | 9/2011 | Ramalingam ........... G06T 7/564 382/103 |
| 2011/0292034 A1 | 12/2011 | Corazza et al. |
| 2011/0296331 A1* | 12/2011 | Iyer .......................... A41H 5/00 715/771 |
| 2011/0304622 A1 | 12/2011 | Rogers et al. |
| 2011/0304629 A1 | 12/2011 | Winchester |
| 2012/0019517 A1 | 1/2012 | Corazza et al. |
| 2012/0038628 A1 | 2/2012 | Corazza et al. |
| 2012/0130717 A1 | 5/2012 | Xu et al. |
| 2012/0327091 A1 | 12/2012 | Eronen et al. |
| 2013/0021348 A1 | 1/2013 | Corazza et al. |
| 2013/0127853 A1 | 5/2013 | Corazza et al. |
| 2013/0215113 A1 | 8/2013 | Corazza et al. |
| 2013/0257877 A1 | 10/2013 | Davis |
| 2013/0271451 A1 | 10/2013 | Tong et al. |
| 2014/0035934 A1 | 2/2014 | Du et al. |
| 2014/0043329 A1 | 2/2014 | Wang et al. |
| 2014/0160116 A1 | 6/2014 | de Aguiar et al. |
| 2014/0204084 A1 | 7/2014 | Corazza et al. |
| 2014/0285496 A1 | 9/2014 | de Aguiar et al. |
| 2014/0313192 A1 | 10/2014 | Corazza et al. |
| 2014/0313207 A1 | 10/2014 | Taylor et al. |

FOREIGN PATENT DOCUMENTS

| | | |
|---|---|---|
| WO | WO 2009/007701 | 1/2009 |
| WO | WO 2010/060113 | 5/2010 |
| WO | WO 2010/129721 | 11/2010 |
| WO | WO 2010/129721 | 6/2011 |
| WO | WO 2011/123802 | 10/2011 |
| WO | WO 2012/012753 | 1/2012 |

OTHER PUBLICATIONS

International Search Report for International Application No. PCT/US09/65825, date completed Jan. 21, 2010, dated Jan. 28, 2010, 3 pgs.

International Search Report for International Application PCT/US2011/045060, completed Nov. 27, 2011, 2 pgs.

International Search Report for PCT/US2010/033797, filed May 5, 2010, report completed Jun. 11, 2010, 2 pgs.

Written Opinion of the International Searching Authority for International Application No. PCT/US09/57155, date completed Dec. 22, 2009, dated Jan. 12, 2010, 6 pgs.

Written Opinion of the International Searching Authority for International Application No. PCT/US09/65825, date completed Jan. 21, 2010, dated Jan. 28, 2010, 6 pgs.

Written Opinion of the International Searching Authority for International Application No. PCT/US2010/033797, filed May 5, 2010, completed Jun. 11, 2010, 4 pgs.

Written Opinion of the International Searching Authority for International Application No. PCT/US2011/045060, completed Nov. 27, 2011, 5 pgs.

Aguiar et al., "Automatic Conversion of Mesh Animations into Skeleton-based Animations", EUROGRAPHICS 2008, vol. 27, No. 2, Apr. 2008.

Anguelov et al., "Recovering Articulated Object Models from 3D Range Data", In Proceedings of the 20th Conference on Uncertainty in Artificial Intelligence, UAI 2004, 18-26.

Anguelov et al., "SCAPE: Shape Completion and Animation of People", Proceedings of the SIGGRAPH Conference, 2005.

Anguelov et al., "The Correlated Correspondence Algorithm for Unsupervised Registration of Nonrigid Surfaces", Advance in Neural Information Processing Systems, 17, 2004, pp. 33-40.

Baran et al., "Automatic rigging and animation of 3D characters", ACM Transactions on Graphics (TOG)—Proceedings of ACM SIGGRAPH 2007, vol. 26, Issue 3, Jul. 2007.

Baran, "Using Rigging and Transfer to Animate 3D Characters", Department of Electrical Engineering and Computer Science Massachusetts Institute of Technology, Sep. 2010.

Beaudoin et al., "Adapting Wavelet Compression to Human Motion Capture Clips", GI '07 Proceedings of Graphics Interface, 2007, 6 pages.

(56) References Cited

OTHER PUBLICATIONS

Blanz et al., "A Morphable Model For The Synthesis of 3D Faces", In Proceedings of ACM SIGGRAPH 11999, 8 pgs.
Blanz et al., "Reanimating faces in images and video." Computer Graphics Forum. vol. 22 No. 3. Blackwell Publishing, Inc., 2003.
Bray, "Markerless Based Human Motion Capture: A Survey", Published 2001, 44 pgs.
Buenaposada et al., "Performance Driven Facial Animation Using Illumination Independent Appearance-Based Tracking", In Proceedings of ICPR, Hong Kong, Aug. 2006, 4 pgs.
Cheung et al., "Shape-from Silhouette of Articulated Objects and its use for Human Body Kinematics Estimation and Motion Capture", In Conference on Computer Vision and Pattern Recognition (CVPR), pp. 77-84, 2003.
Curio et al., "Semantic 3D Motion Retargeting for Facial Animation", ACM 2006, 8 pgs.
Curless et al., "The Space of Human Body Shapes: Reconstruction and Parameterization from Range Scans", ACM Transactions on Graphics, 22(3), pp. 587-594.
Curless et al., "A Volumetric Method of Building Complex Models from Range Images", Retrieved from http://graphics.stanford.edu/papers/volrange/volrange.pdf, pp. 1-10, 1996.
Curless et al., "Articulated Body Deformation from Range Scan Data", ACM Transactions on Graphics, 21(3), 612-619.
Davis et al., "Filing Holes in Complex Surfaces Using Volumetric Diffusion", Proc. First Symposium on 3D Data Processing, Visualization, and Transmission, 2002, pp. 1-11.
De Aguiar et al., "Marker-Less 3D Feature Tracking for Mesh-Based Human Motion Caption", Human Motion 2007, LNCS 4818, 2007, 1-15.
Di Bernardo et al., "Generating Realistic Human Motions from Observations", submitted to Fifth European Conf. on Computer Vision, ECCV 1998, pp. 1-12.
Gao et al., "Motion normalization: the Preprocess of Motion Data", 2005, pp. 253-256.
Garland et al., "Surface Simplification Using Quadric Error Metrics", Proceedings of SIGGRAPH 1997, pp. 209-216, 1997.
Goncalves et al., Reach Out and Touch Space (Motion Learning), Automatic Face and Gesture Recognition, 1998, Proceedings. Third IEEE International Conference on Apr. 14-16, 1998, pp. 234-239.
Grassia, "Believable Automatically Synthesized Motion by Knowledge-Enhanced Motion Transformation", Thesis CMU-CS-00-163, Aug. 21, 2000, 220 pages.
Hahnel et al., "An Extension of the ICP Algorithm for Modeling Nonrigid Objects with Mobile Robots", Proceedings of the International Joint Conference on Artificial Intelligence (IJCAI), 2003, 6pgs.
Hasler et al., "A Statistical Model of Human Pose and Body Shape", Journal compilation © 2008 The Eurographics Association and Blackwell Publishing Ltd.
Hilton et al., "From 3D Shape Capture to Animated Models", First International Symposium on 3D Processing, Visualization and Transmission (3DVPT2002).
Isidro et al., "Stochastic Refinement of the Visual Hull to Satisfy Photometric and Silhouette Consistency Constraints" Boston University Computer Science Tech. Report No. 2003-017, Jul. 31, 2003.
Jones, Michael, and Paul Viola, "Fast multi-view face detection." Mitsubishi Electric Research Lab TR-20003-96 3 (2003): 14.
Ju, et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pages.
Kahler et al., "Head Shop: Generating Animated Head Models with Anatomical Structure", ACM SIGGRAPH Symposium on Computer Animation, pp. 55-64, 2002.
Kalogerakis, "Machine Learning Algorithms for Geometry Processing by Example", Thesis submitted Graduate Department of Computer Science University of Toronto, 2010.
Lewis, "H.264/MPEG-4 AVC CABAC overview", http://www.theonlineoasis.co.uk/notes.html, Dec. 3, 2012.
Lewis et al., "Pose Space Deformation: A Unified Approach to Shape Interpolation and Skeleton-Drive Deformation", Proceedings of ACM SIGGRAPH 2000, pp. 165-172, 2000.
Liepa, "Filing Holes in Meshes", Proc, of the Eurographicsl ACM SIGGRAPH Symposium on Geometry Processing, pp. 200-205, 2003.
Liu et al., "3D Motion Retrieval with Motion Index Tree", Computer Vision and Image Understanding, vol. 92, Issues 2-3, Nov.-Dec. 2003, pp. 265-284.
Liu et al., "Background surface estimation for reverse engineering of reliefs." International Journal of CAD/CAM 7.1 (2009).
Lum et al., "Combining Classifiers for Bone Fracture Detection in X-Ray Images", Image Processing, 2005, ICIP 2005, IEEE International Conference on (vol. 1) Date of Conference Sep. 11-14, 2005, pp. 1149-1152.
Ma et al., "An Invitation to 3D Vision", Springer Verlag, pp. 15-28, 2004.
Mamou et al., "Temporal DCT-based compression of 3D Dynamic Meshes", ICCOM'06 Proceedings of the 10th WSEAS international conference on Communications, Jul. 10-12, 2006, 74-79.
Mamou et al., "The New MPEG-4/FAMC Standard for Animated 3D Mesh Compression", IEEE 3DTV-CON'08, May 2008.
Max Planck Institut Informatik, "Automatic Conversion of Mesh Animations into Skeleton-based Animations", http://www.mpiinf.mpg.de/-edeaguialanimation-eg08.html; Mar. 30, 2008, 9pgs.
Mohr et al., "Building Efficient, Accurate Character Skins from Examples", ACM Transactions on Graphics, 22(3), pp. 562-568.
Noh et al., "Expression Cloning", Proceedings of ACM SIGGRAPH 2001, pp. 277-288, 2001.
Okada et al., "A Video Motion Capture System for Interactive Games.", MVA2007 IAPR Conference on Machine Vision Applications, Tokyo, Japan, May 16-8, 2007, 4 pgs.
Park et al., "On-line locomotion generation based on motion blending", ACM SIGGRAPH Symposium On Computer Animation. San Antonio, Jul. 21, 2002, 8 pages.
Park et al., "On-line motion blending for real-time locomotion generation", Computer Animation & Virtual Worlds. Wiley, UK, vol. 15, No. 3-4, Jul. 2004, 14 pages.
Persson, Per, "ExMS: an animated and avatar-based messaging service for expressive peer communication." Proceedings of the 2003 international ACM SIGGROUP conference on Supporting group work, ACM, 2003.
Popovic et al., "Style-Based Inverse Kinematics", ACM Transactions on Graphics, 23(3), pp. 522-531.
Safonova et al., "Construction and optimal search of interpolated motion graphs", ACM SIGGRAPH, 2007, 11 pgs.
Sand et al., "Continuous Capture of Skin Deformation", ACM Transactions on Graphics, 22(3), pp. 578-586, 2003.
Scholkopf et al., "A Tutorial on support Vector Regression", In Technical Report NC2-TR-1998-030. NeuroCOLT2, Oct. 1998.
Seitz et al., "A comparison and evaluation of multi-view stereo reconstruction alogrithms," Computer vision and pattern recognition, 2006 IEEE Computer Society Conference on vol. 1, IEEE, 2006.
Seo et al., "An Automatic Modeling of Human Bodies from Sizing Parameters", In Symposium on Interactive 3D Graphics, 2003, pp. 19-26.
Sloan et al., "Shape By Example", In 2001 Symposium on Interactive 3D Graphics, pp. 135-144, 2001.
Smola et al., "A Tutorial on Support Vector Regression", Statistics and Computing London 14(3) pp. 199-222, 2004.
Sumner et al., "Deformation Transfer for Triangle Meshes", Proceedings of ACM SIGGRAPH 2004, 23(3), pp. 399-405, 2004.
Szeliski et al., "Matching 3D Anatomical Surfaces with Non-rigid Deformations Using Octree-Splines", International Journal of Computer Vision, 1996, 18,2, pp. 171-186.
Tao et al., "Mean Value Coordinates for Closed Triangular Meshes", Proceedings of ACM SIGGRAPH (2005), 6 pgs.
Taylor et al., "Modeling Human Motion Using Binary Latent Variables", Proc. of Advances in Neural Information Processing Systems (NIPS) 19, 8 pgs.

(56) References Cited

OTHER PUBLICATIONS

Tena, J. Rafael, Fernando De la Torre, and Lain Matthews. "Interactive Region-Based Linear 3D Face Models." ACM Transactions on Graphics (TOG). vol. 30. No. 4. ACM, 2011.
Tung et al., "Topology Matching for 3D Video Compression Computer Vision and Pattern Recognition", IEEE Conference Computer Vision and Pattern Recognition, 2007, Jun. 2007, 8 pgs.
Vasilescu et al., "Multilinear Analysis of Image Ensembles: Tensorfaces", European Conference on Computer Vision (ECCV), pp. 447-460, 2002.
Vlasic et al., "Face Transfer with Multilinear Models", ACM Transactions on Graphics 24(3), pp. 426-433, 2005.
Vlasic et al., "Multilinear Models for Facial Synthesis", SIGGRAPH Research Sketch, 2004.
Von Luxburg, "A Tutorial on Spectral Clustering. Statistics and Computing", 2007, 32 pgs.
Wang et al., "Multi-weight Enveloping: Least Squares Approximation Techniques for Skin Animation", ACM SIGGRAPH Symposium on Computer Animation, pp. 129-138, 2002.
Weise et al., "Realtime Performance-Based Facial Animation." ACM Transactions on Graphics (TOG) vol. 30, No. 4, ACM (2011).
Weise, Thibaut, et al. "Face/off: Live facial puppetry." Proceedings of the 2009 ACM SIGGRAPH/Eurographics Symposium on Computer animation. ACM, 2009.
Wikipedia, "Morph target animation", Last Modified Aug. 1, 2014, Printed Jan. 16, 2015, 3 pgs.
Zhidong et al., "Control of motion in character animation", Jul. 14, 2004, 841-848.
Zhu "Shape Recognition Based on Skeleton and Support Vector Machines", ICIC 2007, CCIS 2, pp. 1035-1043, 2007.© Springer-Verlag Berlin Heidelberg 2007.
Zordan et al., "Dynamic Response for Motion Capture Animation", ACM Transactions on Graphics—Proceedings of ACM SIGGRAPH 2005, vol. 24, Issue 3, Jul. 2005, pp. 697-701.
U.S. Appl. No. 13/681,120, filed Mar. 17, 2015, Office Action.
U.S. Appl. No. 13/681,120, filed Dec. 1, 2015, Office Action.
U.S. Appl. No. 13/681,120, filed Jun. 1, 2016, Office Action.
U.S. Appl. No. 13/681,120, filed May 16, 2017, Office Action.
U.S. Appl. No. 13/681,120, filed Oct. 25, 2017, Office Action.
U.S. Appl. No. 13/681,120, filed Apr. 8, 2020, Notice of Allowance.
U.S. Appl. No. 13/773,344, filed May 23, 2014, Office Action.
U.S. Appl. No. 13/787,541, filed Mar. 12, 2015, Office Action.
U.S. Appl. No. 13/787,541, filed Sep. 18, 2015, Notice of Allowance.
U.S. Appl. No. 13/787,541, filed Feb. 26, 2016, Office Action.
U.S. Appl. No. 13/787,541, filed Oct. 3, 2016, Office Action.
U.S. Appl. No. 13/787,541, filed Feb. 21, 2017, Notice of Allowance.
U.S. Appl. No. 13/787,541, filed Apr. 10, 2017, Notice of Allowance.
U.S. Appl. No. 14/222,390, filed May 22, 2014, Office Action.
U.S. Appl. No. 14/222,390, filed Oct. 16, 2014, Office Action.
U.S. Appl. No. 14/222,390, filed Apr. 10, 2015, Office Action.
U.S. Appl. No. 14/222,390, filed Oct. 29, 2015, Office Action.
U.S. Appl. No. 14/222,390, filed Mar. 23, 2016, Office Action.
U.S. Appl. No. 14/222,390, filed Oct. 26, 2016, Office Action.
U.S. Appl. No. 15/044,970, filed Jul. 11, 2016, Preinterview 1st OA.
U.S. Appl. No. 15/044,970, filed Dec. 1, 2016, Notice of Allowance.
Lum et al., "Combining Classifiers for Bone Fracture Detection in X-Ray Images", Image Processing, 2005, ICIP 2005, IEEE International Conference on (vol. 1) Date of Conference: Sep. 11-14, 2005, pp. 1149-52.
Tena, J. Rafael, Fernando De la Tone, and Lain Matthews. "Interactive Region-Based Linear 3D Face Models." ACM Transactions on Graphics (TOG). vol. 30. No. 4. ACM, 2011.
U.S. Appl. No. 13/787,541, filed Apr. 20, 2017, Notice of Allowance.

* cited by examiner

AUTOMATIC RIGGING OF THREE DIMENSIONAL CHARACTERS FOR ANIMATION

CROSS-REFERENCE TO RELATED APPLICATIONS

The present application is a continuation of U.S. application Ser. No. 13/681,120, filed on Nov. 19, 2012 which claims priority to U.S. Provisional Application No. 61/561,228, filed on Nov. 17, 2011. The aforementioned applications are hereby incorporated by reference in their entirety.

FIELD OF THE INVENTION

This invention generally relates to animation of a three dimensional character; and to automated systems and methods for rigging a mesh for animating a three dimensional character. More particularly, this invention generally relates to animation of a facial mesh of a three dimensional character and to automated systems and methods for rigging the facial mesh of a three dimensional character.

BACKGROUND

The generation of three dimensional (3D) content, particularly 3D animated content, is becoming more popular. Animated 3D content is typically included in animated movies, virtual storytelling, 3D animations for video games in particular the cut away scenes in the game, 3D simulations of industrial uses, teleconferencing, and social interaction. Despite these emerging uses, the creation of 3D characters that can be animated is still typically only performed by artists that have specialized training in animation. Specifically, the creation of an animated sequence with one or more characters often requires a group of specialized 3D animation artists and animators.

The most difficult process in generating an animated sequence is the creation of a rigged mesh for an animated character. For purposes of this discussion, a mesh is a set of polygons (segments) defining the surface of an object or character; and a rigged mesh is a mesh that further includes a skeleton or set of bones and skinning weights. The skeleton or bone set is used to define character movement; and skinning weights are a set of relations that govern the motion of the mesh polygons (segments) with respect to the underlying skeleton. The creation of the skeleton or bone set often requires identifying key points of the character mesh. These key points may include, but are not limited to corners of a mouth, corners of the eyes, and other features important for movement. Typically, the process or creating the skeleton and skinning weights is performed by an animation process performed manually herein after termed forward kinematic rigging.

Animation of a rigged 3D character can be achieved by motion applied to the bones which drive the mesh. Animation may also be obtained using blend shapes on a per vertex animation using a manually intensive process. The bone set and skinning weights may be converted into a blend shape animation process by identification of appropriate morph targets.

SUMMARY OF THE INVENTION

Systems and methods for automatically rigging a mesh for the face of a three dimensional character in accordance with embodiments of this invention are disclosed. In accordance with some embodiments of this invention, systems and methods for automatic rigging of a three dimensional are performed in the following manner. An original three dimensional (3D) mesh of a character is received. A representative mesh is generated from the original mesh. A set of segments is then determined and key points are identified for the representative mesh. A bone set including bones for relating segments of the representative mesh is generated. The bones in the bone set are then placed in the representative mesh and skinning weights of the representative mesh is determined from the placement of the plurality of bones of the bone set in the representative mesh. The bone set, the segments, and skinning weights of the representative mesh are then translated into the original mesh to create a rigged mesh.

In accordance with some embodiments, the generation of the representative mesh is completed by performing a volumetric method on the original mesh. in accordance with some of these embodiments, the volumetric method includes generating a visual hull.

In accordance with some embodiments, the determining of the segments is done by performing a machine learning process to assign the segments. In accordance with some of these embodiments, the machine learning process is a JointBoost process. In accordance with some of these embodiments, the machine learning process is performed in the following manner. The representative mesh and a training set of meshes is received. Features are extracted from the representative mesh and each of the meshes in the training set. Segments of the representative mesh are probabilistically estimated using the machine learning process based on the extracted features of representative mesh and the extracted features of meshes in the training sets. The segments of the representative mesh are then determined from estimated segments such that the segments of the representative mesh provide reasonable boundaries between regions of the character and overall smoothness. In accordance with some of these embodiments, the determining of the of the of segments from the estimated segments is performed by applying a Conditional Random Fields (CFR) process to the estimated segments using a training set of segments. In accordance with further of these embodiments, the training set meshes includes a training set of meshes and at least one of a test set of meshes and a gold standard of segments.

In accordance with some embodiments, the key points are identified by applying a machine learning process to the segments of the representative mesh. In accordance with some embodiments, the identifying of the key points includes receiving user inputs of points on the representative mesh that are provided to the machine learning process.

In accordance with some embodiments, the bone set is generated a process performed in the following manner. The representative mesh, the segments of representative mesh, and the key points of the representative mesh are received by the process. A training set of bone sets that includes different bone sets is received. A machine learning process is then applied to the representative mesh including the segments and the key points of the representative mesh that uses the training set of bone sets to determine a bone set for the representative mesh. In accordance with some of these embodiments, the machine learning process is a Support Vector Machine. In accordance with some of these embodiments, the process of generating the bone set further includes receiving a user input of bone parameters and providing the bone parameters to the machine learning process to generate the bone set for the representative mesh.

In accordance with some embodiments, the determining of the skinning weights is determined using a diffusion process. In accordance with some of these embodiments, a process for determining the skinning weights is performed in the following manner. The process receives the representative mesh with the bone set, key points, and segments. The parameters for the skinning weights are determined. A Poisson problem is then generate for each of the segments by modeling each of the segments as a heat emitting body and the surrounding segments as heat absorbing bodies. Skinning templates are then created using the Poisson problem generated for each of the segments and a machine learning process using a training set of manually skinned models. The skinning weights are then calculated from the skinning templates.

In accordance with some embodiments, the translating of the bone set and skinning weights into the original mesh is performed using a point to polygon nearest neighbor search process.

In accordance with some embodiments, a topology of a rigged mesh is improved after the rigged mesh is generated.

In accordance with some embodiments, the rigged mesh is transmitted to a user device. In accordance with some other embodiments, the rigged mesh is stored in memory.

DETAILED DISCLOSURE OF THE INVENTION

Turning now to the drawings, systems and methods for automated rigging of 3D characters, and in particular facial rigging, in accordance with embodiments of the invention are illustrated. In accordance with many embodiments of the invention, the system receives an original 3D mesh of a character. A representative mesh is then generated from the received original mesh. Segments, key points, a bone set and skinning weights are then determined for the representative mesh. The bone set and skinning weights for the representative mesh are than applied to the original mesh to generate a rigged mesh. While the following discussion of systems and methods in accordance with embodiments of the invention focuses primarily upon the automated rigging of a facial mesh of a 3D character, similar systems and methods can also be adapted for use in rigging meshes that describe the surface of other portions of 3D characters including (but not limited to) meshes of an entire 3D character without departing from the invention. Furthermore, the described embodiments provide a rigged mesh that utilizes bones and skinning weights to drive the animation of the facial mesh of a 3D character. However, embodiments of the invention can also be utilized to rig facial meshes for use in blend shape animation through the usage of appropriate morph targets. Systems and methods for automatically rigging facial meshes of 3D characters in accordance with embodiments of the invention are discussed further below.

System Overview

Figure 1:
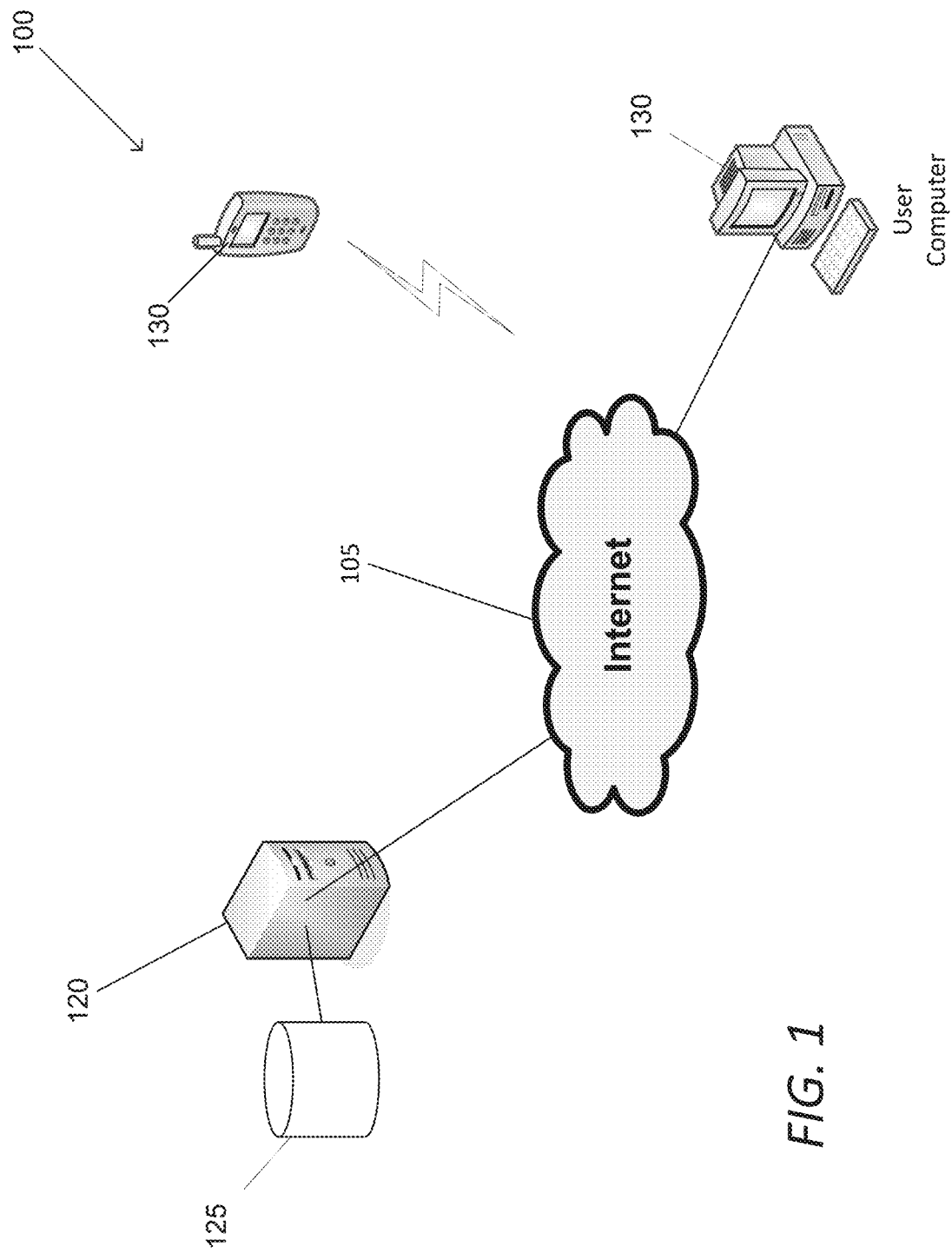
FIG. 1 illustrates a network including devices that may perform the systems and methods for automatically rigging a mesh in accordance with embodiments of this invention.

Devices that can be utilized to automatically rig the facial mesh of a 3D character, either acting singly or jointly through communication over a network in accordance with embodiments of an invention are shown in FIG. 1. In the illustrated embodiment, the automatic facial rigging system 100 includes a server 120, a mobile device 130, and a personal computer 140 which are connected via a network 105. The network 105 may be the Internet, a Wide Area Network (WAN), a Local Area Network (LAN) or any other type of network that allows processing devices to communicate with one another to transmit data. The server 120 is a processing system that communicates with other devices via the network 105. The server 120 may be connected to a database 125 or other data storage system to store data utilized during the automatic rigging of facial meshes. Although shown as a single device, it can be appreciated that the server 120 may be one or more servers connected via one or more routers or other switching devices that perform appropriate process and/or provide appropriate data. In many embodiments, a mobile device 130 can be (but is not limited to) a network accessible mobile telephone, a tablet, a Personal Digital Assistant, (PDA), a notebook computer, or any other device that includes a processing system that may wirelessly connect to the network 100. Furthermore, the term personal computer 140 is used to encompass any processing system that may be connected via a hard-wired or wireless connection to the network 100.

In a number of embodiments, a mobile device 130 or a personal computer 140 may transmit an original 3D mesh of a character to the server 120, which automatically rigs the facial mesh. In some embodiments, the mobile device 130 or the personal computer 140 can perform automatic rigging of a facial mesh. In many embodiments, the mobile device 120 or the personal computer 130 communicates with the server 120 to receive data utilized to perform automatic rigging of a facial mesh. Furthermore, one skilled in the art will recognize that other configurations of devices may perform different tasks associated with the automatic rigging of a facial mesh in accordance with embodiments the invention and the preceding configurations are for example only and in no way limiting.

Device Architecture

Figure 2:
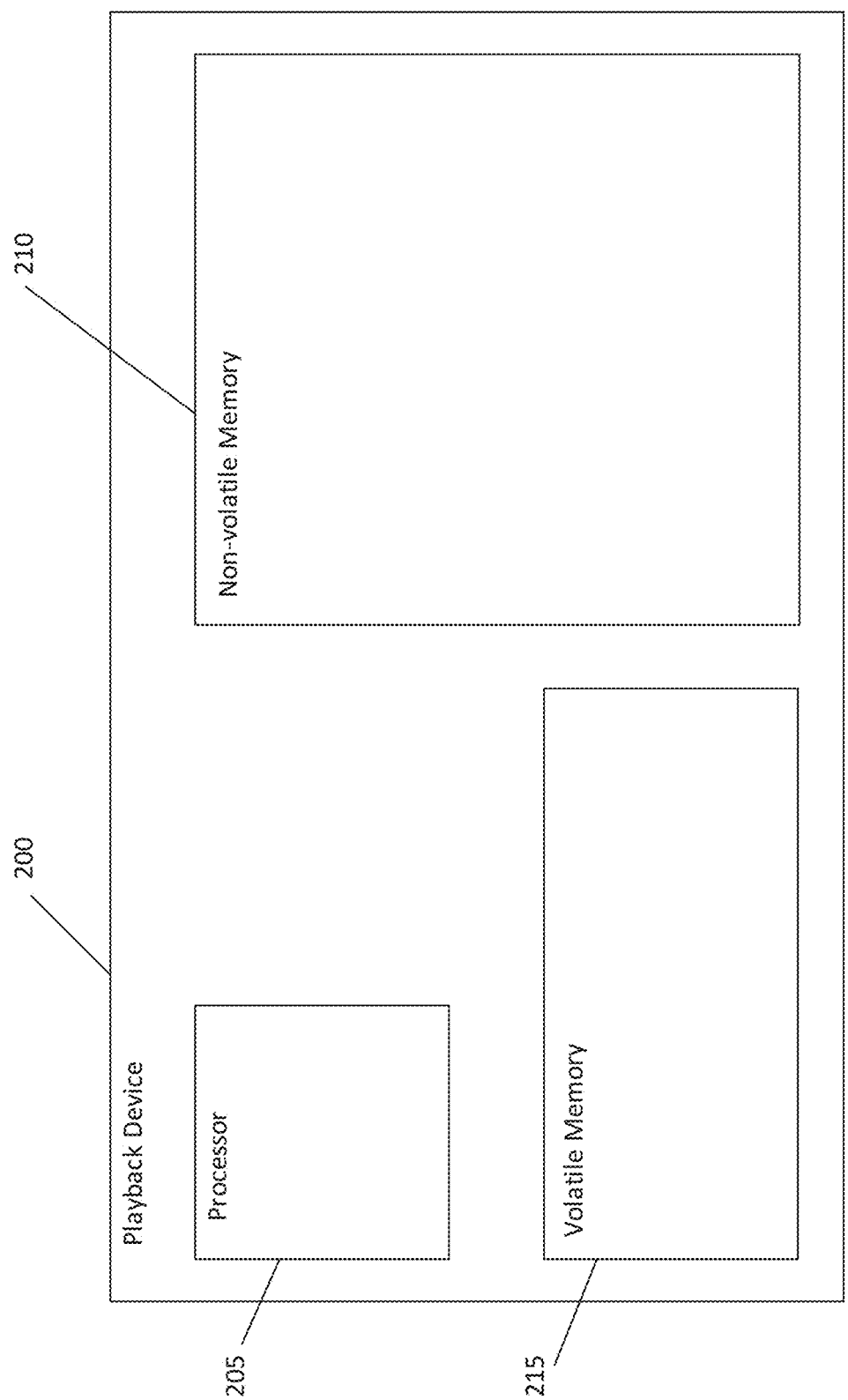
FIG. 2 illustrates a block diagram of components of a device configured to automatically rig a mesh in accordance with embodiments of this invention.

In many embodiments, the systems and methods for automated rigging of a facial mesh of a 3D character are implemented using hardware, software, and/or firmware. A processing system configured to automatically rig a facial mesh of a 3D character in accordance with an embodiment of this invention is shown in FIG. 2. The processing system 200 includes a processor 205, a non-volatile memory 210, and a volatile memory 215. The processor 205 can be a processor, microprocessor, controller, or a combination of processors, microprocessor, and/or controllers that performs instructions stored in the volatile 215 or non-volatile memory 210 to manipulate data stored in the memory. The non-volatile memory 210 and/or volatile memory 215 can store the processor instructions utilized to configure the device 200 to perform processes including automatically rigging a facial mesh of a 3D character. In addition, the various memories can be utilized to store data utilized during an automated facial rigging process. The software and/or firmware utilized to configure the processor to automatically rig a facial mesh of a 3D character in accordance with embodiments of the invention can be stored in any of a variety of computer readable media. In reviewing the processing system illustrated in FIG. 2, one skilled in the art will recognize that such a processing system may include other components that are omitted for brevity without departing from this invention.

Although specific systems and devices that are configured to automatically rig a facial mesh of a 3D character are discussed above, any of a variety of systems and/or devices can be utilized to automatically rig facial meshes of 3D characters in accordance with embodiments of the invention. Processes for rigging facial meshes of 3D characters in accordance with embodiments of the invention are discussed further below.

Automated Rigging Process

Figure 3:
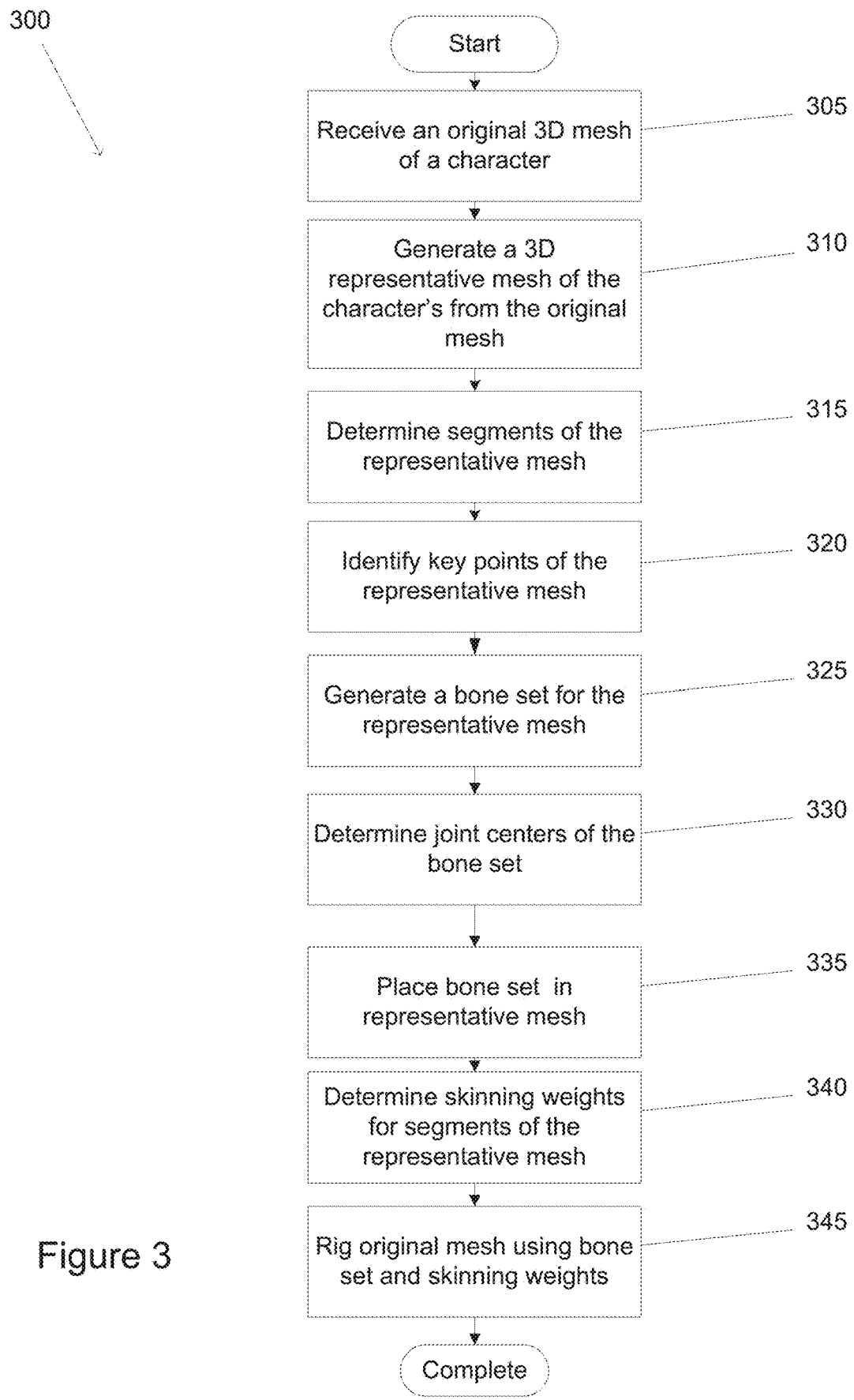
FIG. 3 illustrates a flow diagram of a process for generating a rigged mesh from an original 3D mesh of a character in accordance with embodiments of this invention.
Figure 8:
FIG. 8 illustrates an example of an original 3D mesh in accordance with embodiments of this invention.

In several embodiments, systems for automatically rigging facial meshes of 3D characters receive an original mesh of the face of a 3D character and provide a rigged mesh of the face of the 3D character. Processes for automatically rigging facial meshes of 3D characters in accordance with embodiments of this invention may be fully automated or may allow user interaction to provide inputs of parameters to aid in the rigging process. A process generating a rigged facial mesh using an original facial mesh in accordance with embodiments of this invention is shown in FIG. 3. The process 300 utilizes (305) an original facial mesh. An example of an original facial mesh of a 3D character is shown in FIG. 8. The character 800 shown in FIG. 8 may include multiple interconnected meshes, meshes with manifold entities, and meshes with different levels of detail that make generating a rigged mesh problematic. To overcome these problems, the process 300 generates (310) a representative mesh. The representative mesh may be generated through a volumetric method. In particular, a volumetric method such as, but not limited to, a visual hull technique may be used to generate the representative mesh in accordance with some embodiments of this invention. A visual hull is a locally convex approximation of the outer geometry of the original 3D mesh composed of a single interconnected mesh of a given resolution A process using a visual hull to generate a representative mesh is described in U.S. patent application Ser. No. 13/038,185, entitled "Automatic Generation of 3D Character Animations for 3D Meshes" in the name of Corazza et al., the disclosure of which is hereby incorporated by reference in its entirety.

Figure 9:
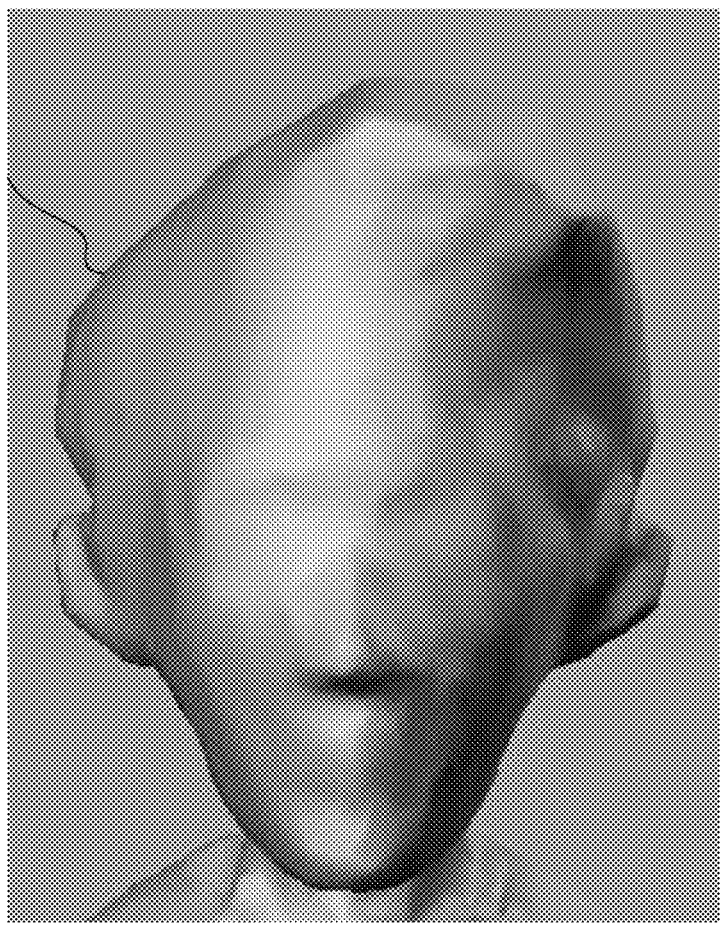
FIG. 9 illustrates an example of a representative 3D mesh generated from the original 3D mesh shown in FIG. 8 in accordance with embodiments of this invention.

An example of a representative mesh generated for the original mesh 800 shown in FIG. 8 is illustrated in FIG. 9. In the illustrated embodiment, the representative mesh is generated using a visual hull method and the representative mesh 900 is a single interconnected mesh representing the outer surface of the face of a 3D character 900. Any problematic areas of original mesh 800 are removed in mesh 900. In other embodiments, any of a variety of techniques can be utilized to generate one or more representative meshes that can be utilized in the rigging of the original facial mesh.

Figure 10:
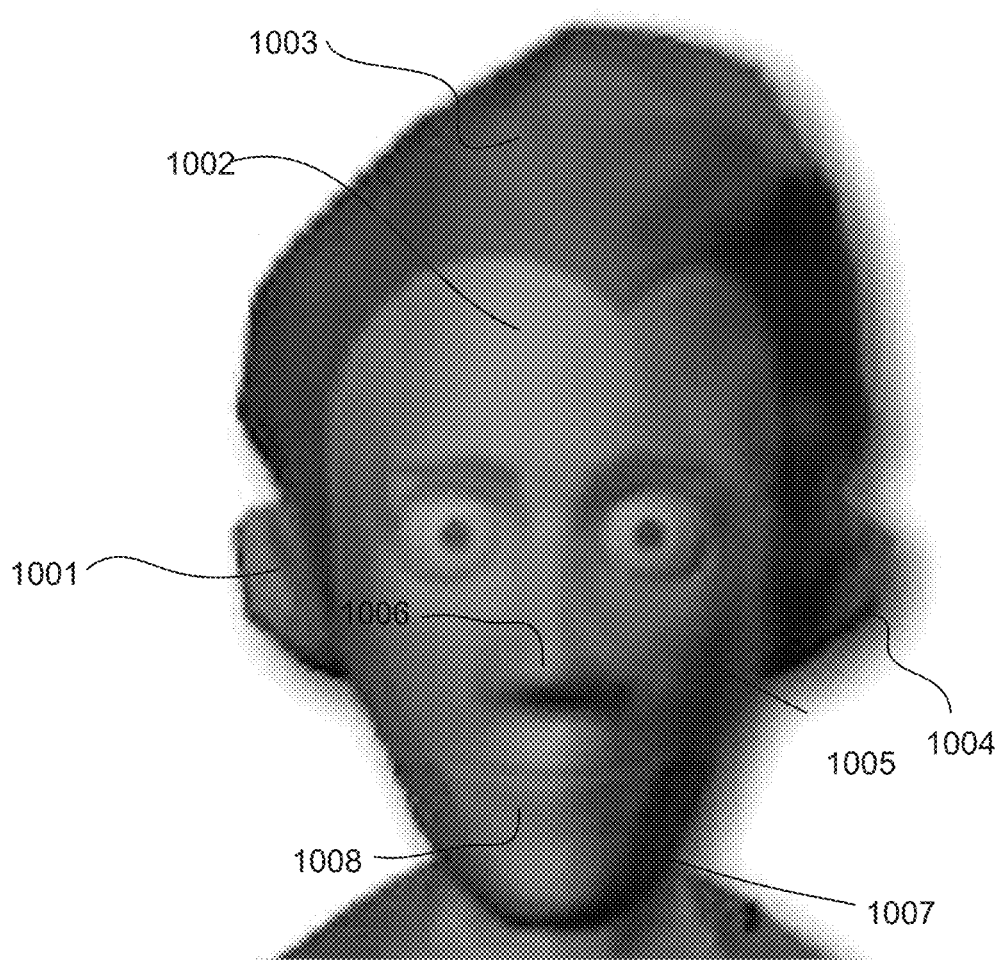
FIG. 10 illustrates an example of segments of the representative 3D mesh shown in FIG. 9 as determined in accordance with embodiments of this invention.

Turning back to FIG. 3, the process 300 can determine (315) the segments of the representative hull. Each segment is one interrelated area of the representative mesh. A representative mesh with identified segments in accordance with embodiments of this invention is shown in FIG. 10. In FIG. 10, the representative mesh 900 (as originally shown in FIG. 9) includes identified segments 1001-1008. Each segment is a portion of the mesh that is interrelated. For example, segments 1001 and 1004 are ear segments; and segment 1006 is a nose segment. A process for determining the segments of the representative mesh in accordance with embodiments of this invention is described below with reference to FIG. 4.

Figure 11:
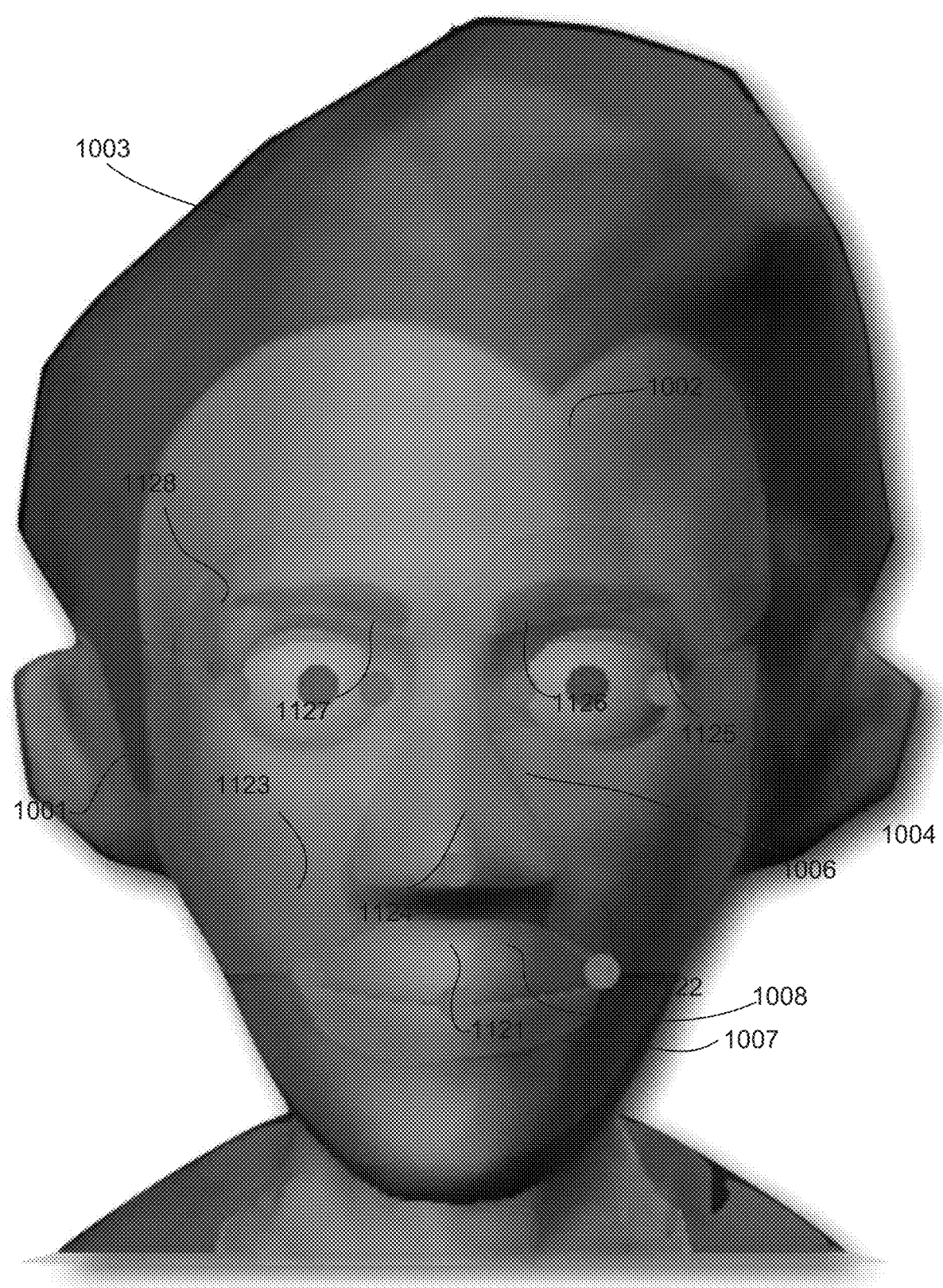
FIG. 11 illustrates an example of segments and key points of the representative 3D mesh shown in FIG. 9 as determined in accordance with embodiments of this invention.

After the segments of the representative mesh are identified, key points of the representative mesh are identified (320). Key points are points at the borders of segments that can be utilized in the animation of the mesh. An example of key points in a representative mesh is shown in FIG. 11. In FIG. 11, representative mesh 900 with segments 1001-1008 includes key points 1121-1128. Key points 1121-1128 are points such as (but not limited to) the edges of the mouth, the center of the mouth, the tip of the nose and the corners of the eyes that need to be identified to provide animation of the facial mesh 900. A process for identifying the key points of a segmented representative mesh in accordance with embodiments of this invention is described below with reference to FIG. 5.

Figure 12:
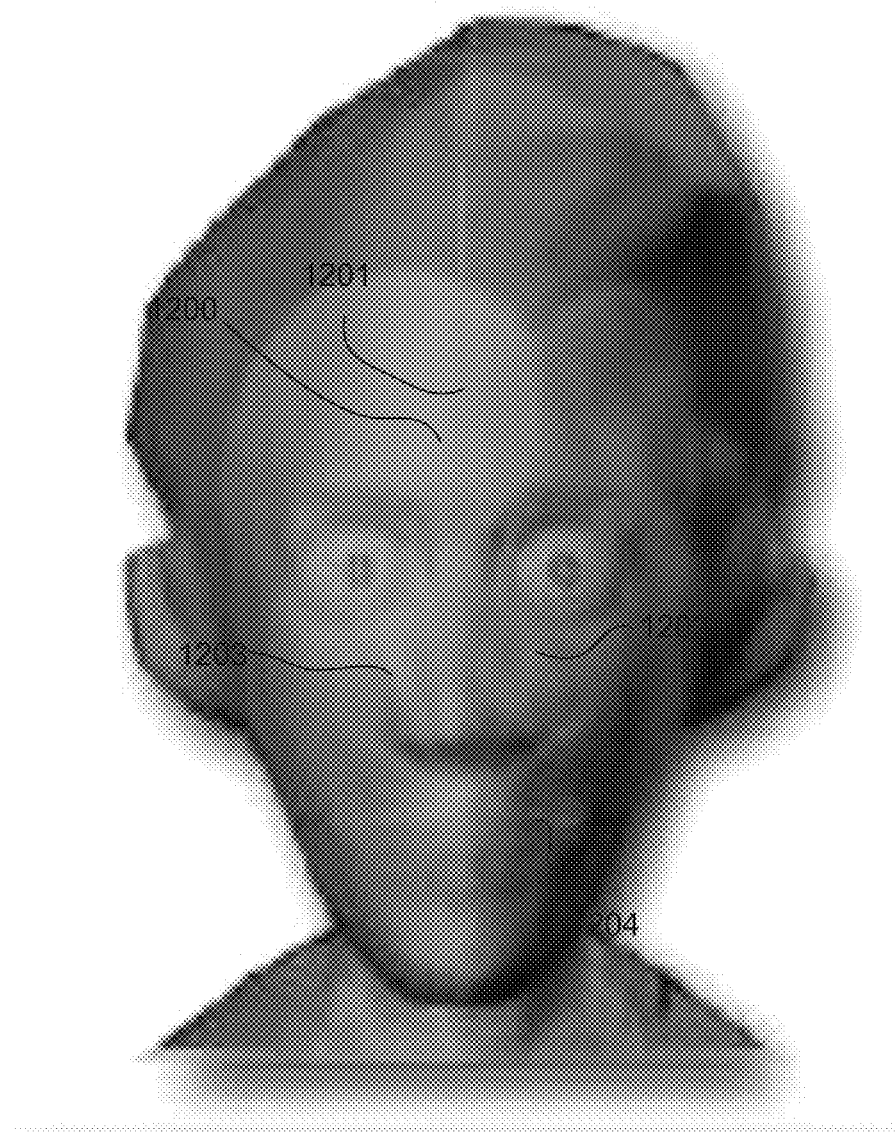
FIG. 12 illustrates an example of a bone set generated for the representative 3D mesh shown in FIG. 9 as determined in accordance with embodiments of this invention.

Referring again to FIG. 3, a bone set for the representative mesh is generated (325) from the segmentation and key points. The bone set is a set of bones that can be utilized to rig the facial mesh. Each bone is a line that establishes a relationship between segments of the mesh and that is used to manipulate the related segments of the mesh during animation. An example of a bone set in accordance with embodiments of this invention is shown in FIG. 12. The bone set 1200 includes bones 1201-1202 that each establish a relationship between specific portions of representative mesh 900. A process for generating the bone set from the segmentation and key points of the representative mesh in accordance with embodiments of this invention is described below with reference to FIG. 6.

Referring back to FIG. 3, joint centers of the bone set are determined (330). The joint centers may be identified using a Support Vector Machine using the location of key points as an input in accordance with embodiments of this invention. In other embodiments, any of a variety of techniques can be utilized to identify joint centers as appropriate to the requirements of a specific application. Once the joint centers are determined, the bones of the bone set are placed (335) in the representative mesh. The orientation of bone local coordinate frames is defined in order to allow for an optimal ability to edit the animation curves.

Figure 13:
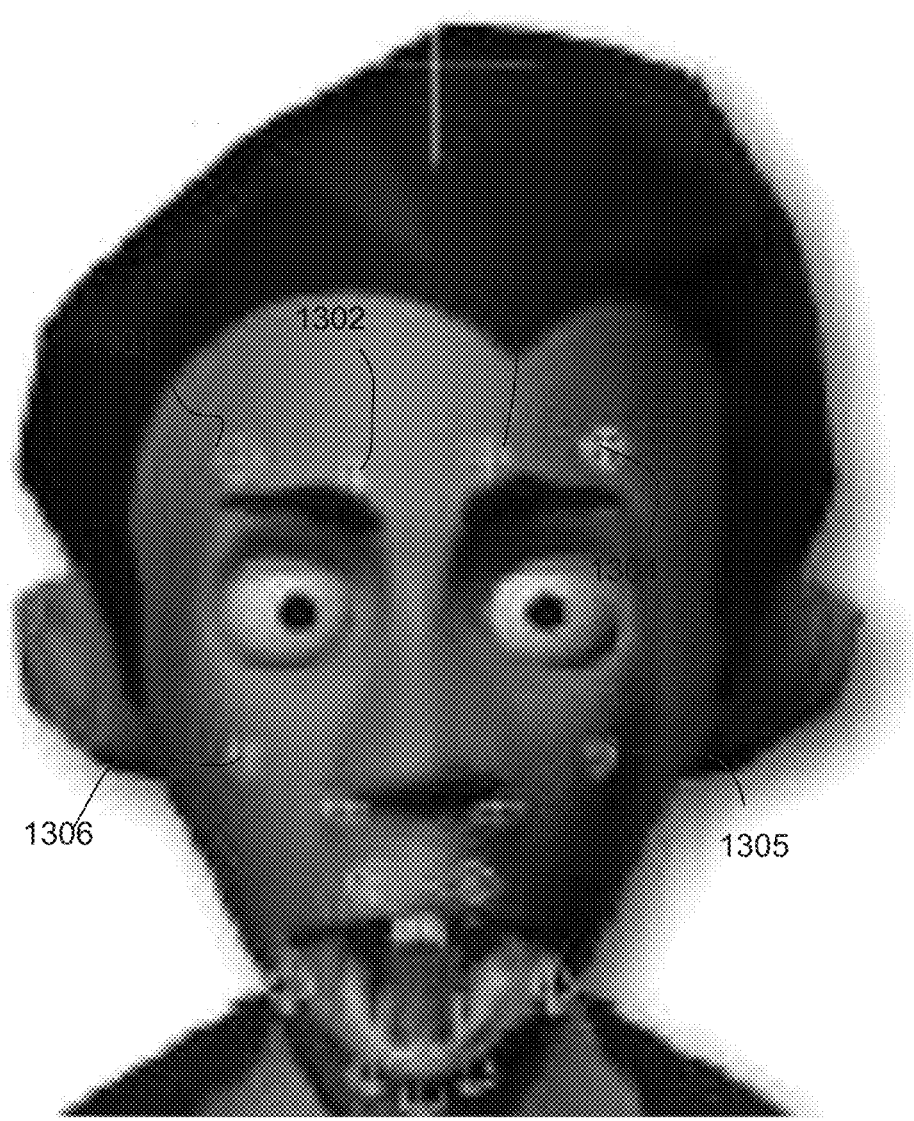
FIG. 13 illustrates an example of skinning weights determined for the representative 3D mesh shown in FIG. 9 as determined in accordance with embodiments of this invention.

The representative mesh with the bones placed in the mesh can be used to determine (340) the skinning weights for the segments of the representative. The skinning weights define the relation between the motion of the 3D representation polygons (segments) and the underlying bone set. An example of skinning weights in accordance with embodiments of this invention is shown in FIG. 13. In FIG. 13, the skinning weights include skinning weights 1301-1306 that define the motion of certain portions of the representative mesh. A process for determining the skinning weights of the representative mesh in accordance with embodiments of this invention is described below with reference to FIG. 7.

In the process 300 shown in FIG. 3, the bone set and skinning weights of the representative mesh can be translated (345) to the original mesh to create a rigged facial mesh. In accordance with some embodiments of this invention, the translation of the bones and skinning weights may be performed using a mean value coordinate system. In accordance with other embodiments of this invention, the translation may be performed using other processes including (but not limited to) a point to polygon nearest neighbor search process. In the point to polygon process, each vertex in the original mesh is associated with a closest polygon (segment) on the representative mesh used for skinning processing. Local interpolation is then used to derive skinning weights of the original mesh vertices from those of the respective closest polygons (segments) vertices on the representative mesh.

After the bone set and skinning weights are translated to the original mesh to create the rigged mesh, user inputs may be used to improve the topology of the rigged mesh. This may include inputs to alter the size, aspect ratio, location, and/or rotation of the segments of the rigging mesh while maintaining the overall shape of the rigging mesh. The improved topology may allow the rigging mesh to deform better when the bones are animated.

Although a specific process for automatically rigging a facial mesh is discussed above with reference to FIG. 3, any of a variety or processes can be utilized to rig a facial mesh in accordance with embodiments of the invention. Various processes that can be utilized to identify representative meshes, identify segments of representative meshes corresponding to portions of a face, identify a bone set and skinning weights for the representative mesh, and for rigging the original facial mesh based upon the rigging of the representative mesh in accordance with embodiments of the invention are discussed further below.

Identifying Segments of a Facial Mesh Corresponding to Portions of a Face

When a representative mesh has been generated to deal with problematic areas of an original facial mesh of a 3D character, segments of the representative mesh corresponding to portions of a face can be identified. In many embodiments, artificial intelligence is used to identify the segments. In particular, machine learning processes can be used to identify various segments of the representative mesh corresponding to different portions of a face.

Figure 4:
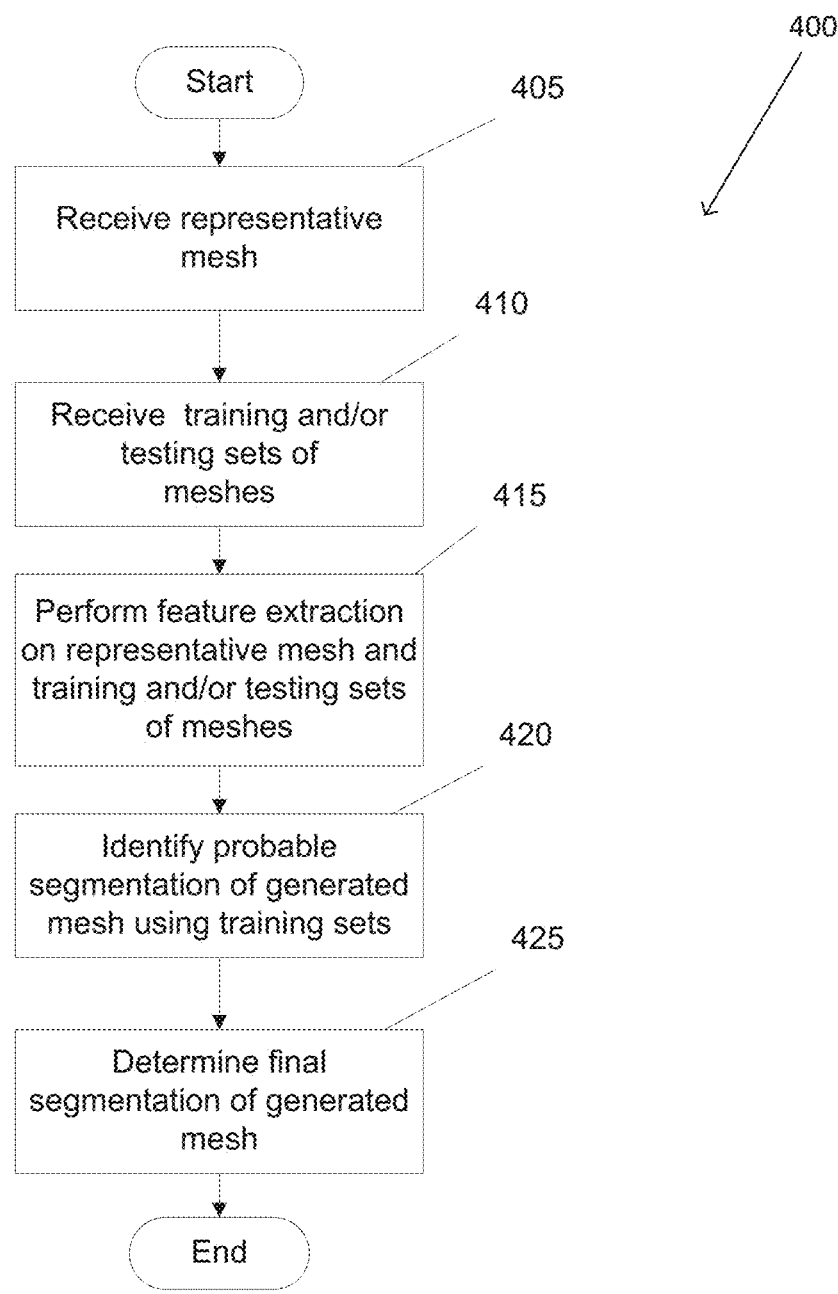
FIG. 4 illustrates a flow diagram of a process for determining segments of a representative mesh in accordance with embodiments of this invention.

A process that identifies segments of a representative mesh corresponding to portions of a face in accordance with embodiments of this invention is shown in FIG. 4. The process 400 utilizes (405) a representative mesh generated from an original facial mesh of a 3D character. The process 400 also utilizes (410) a training set of facial meshes in which segments corresponding to portions of a face (or other appropriate portions) are identified. The training set may include a training set of meshes, at least one of a testing set of meshes, and a set of gold standard segmentations. The testing set of meshes includes meshes which the machine learning process can use to learn to identify the segments of a facial mesh before generating the segments for the representative mesh. The gold standard segments are a set of facial meshes in which all of the segments are clearly identified to aid in learning for the identification process.

The process 400 can perform (415) feature extraction on the representative mesh and the meshes in the training set. The extracted features are then provided to a learning process to perform the identification of the segments in the representative mesh. In accordance with an embodiment of this invention, the learning technique that is used is a JointBoost process and/or a Conditional Random Fields (CRF) process. The JointBoost process learns (420) probabilistically to estimate the segments of the representative mesh 420. The CRF process is a learning process that receives the probabilities of the segments from the JointBoost process and determines (425) a final segmentation of the representative mesh.

Identification of Key Points within a Representative Mesh

Once the segments of the representative mesh are identified, the key points of the representative mesh can be determined. Key points are typically points at borders between segments in a representative mesh. A machine learning process may be used to identify the key points. To aid in identification of key points, a user interface for providing data about key points is provided in accordance with some embodiments of this invention.

Figure 5:
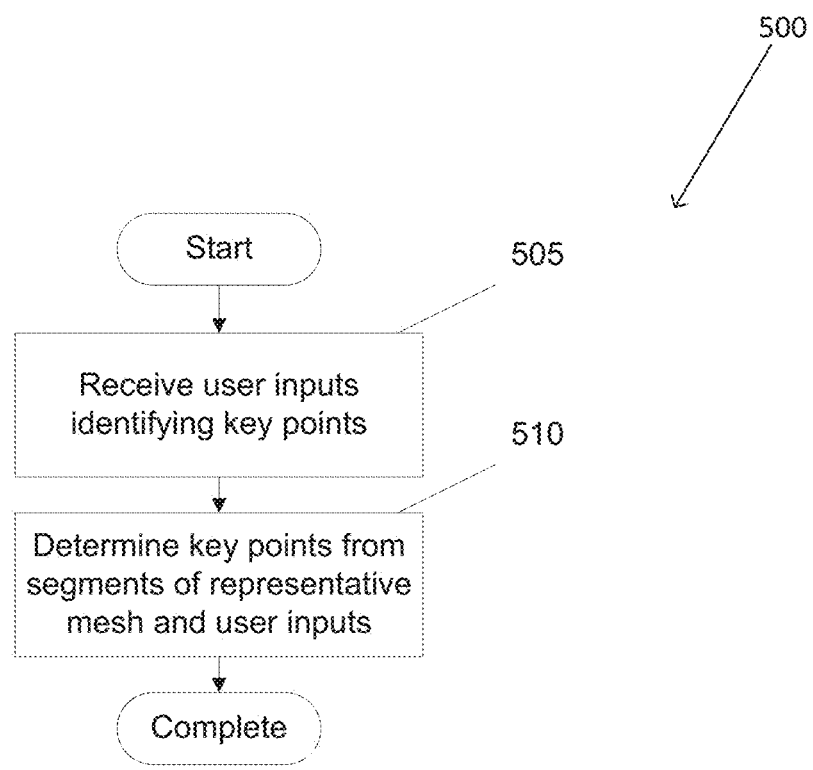
FIG. 5 illustrates a flow diagram of a process for identifying key points in a representative mesh in accordance with embodiments of this invention.

A process for identifying key points from a representative mesh in which segments corresponding to portions of a face have been identified in accordance with an embodiment of this invention is shown in FIG. 5. The process 500 begins by receiving (505) inputs of data from a user that helps in identifying key points through a user interface or via metadata associated with the representative mesh. This data may include, but is not limited to, the corner of the eyes; the tip of the nose; the corners of the mouth; and the inner and outer points on the eyebrows. The input data is then provided to one or more machine learning processes, such as the JointBoost and CRF process combination that identifies (510) the key points which uses the input data to better position the key points. In other embodiments, key points are identified manually. In several embodiments, any of a variety of processes trained using any of a variety of machine learning techniques can be utilized to identify key points. Based on the key points, a bone set can be generated. The generation of a bone set in accordance with embodiments of the invention is discussed further below.

Generating a Bone Set

A bone set may be generated for the representative mesh after the segments and key points of the representative mesh are identified. Each bone is a line that connects two or more segments of the mesh that can be manipulated to animate the mesh. The generation of the bone set includes determining the number of bones needed, size of each bone, the placement of each bone, and the interconnection of bones. The generation of the bone set is typically performed by a machine learning process. A user interface that allows a user to enter specific parameters such as, but not limited to, the number of bones; and maximum and minimum size of the bones may be provided to allow a user to customize the bone set.

Figure 6:
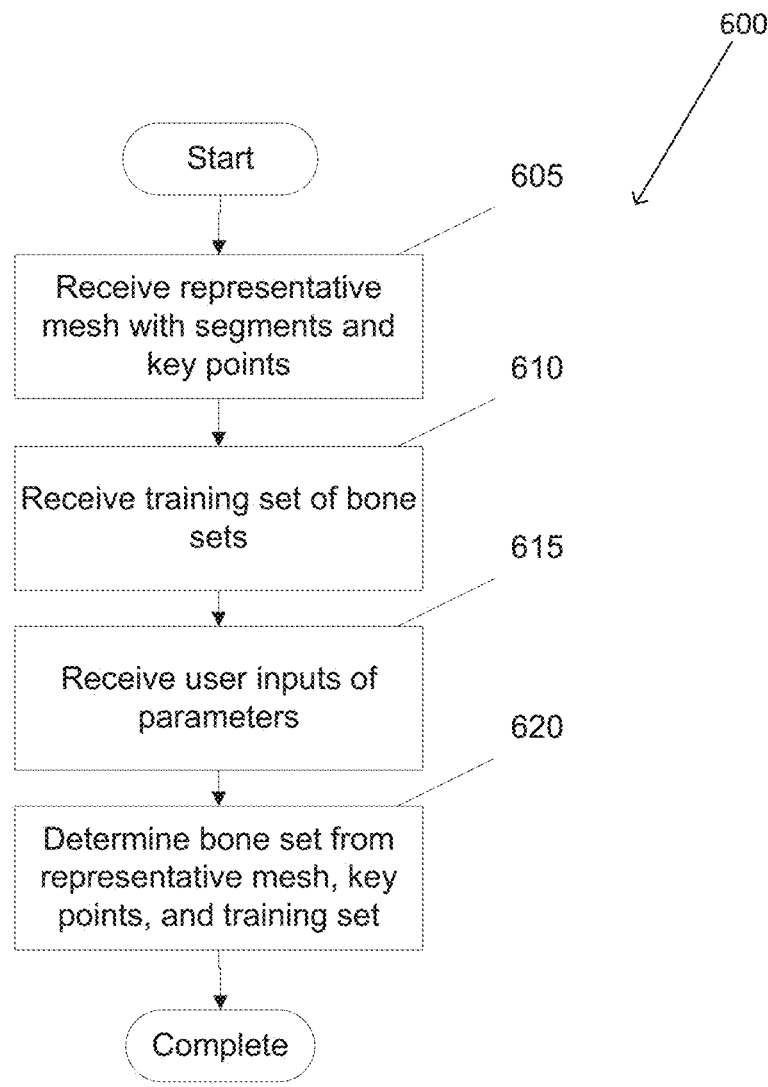
FIG. 6 illustrates a flow diagram of a process for generating a bone set for a representative mesh in accordance with embodiments of this invention.

A process for generating the bone set for a representative mesh using a machine learning process in accordance with an embodiment of this invention is shown in FIG. 6. The process 600 begins by receiving (605) the representative mesh with identified segments and key points. A training set of meshes with bone sets is received (610). User input parameters can also be received (615). A Support Vector Machine can be used to determine (620) the bone set for the representative mesh. The Support Vector Machine receives the training set of meshes with bone sets to learn bone placement. The Support Vector Machine then receives the user input and representative mesh and generates the bone set for the representative mesh based upon the training set and user inputs. Although a Support Vector Machine is referenced above, any of a variety of machine learning techniques can be utilized to automate bone placement as appropriate to the requirements of a specific application in accordance with embodiments of the invention. Once the bones of the bone set have been placed and the joint centers of the bones have been identified, the skinning weights for the representative mesh may be determined. Processes for determining skinning weights in accordance with embodiments of the invention are discussed further below.

Determining Skinning Weights

A set of skinning weights defines the relationships between the motion of the segments of the mesh and underlying bone set. In accordance with embodiments of this invention, one of many methods such as, but not limited to, diffusion, proximity maps, and templates may be used to determine the skinning weights. User inputs may also be used in these methods to determine skinning weights.

Figure 7:
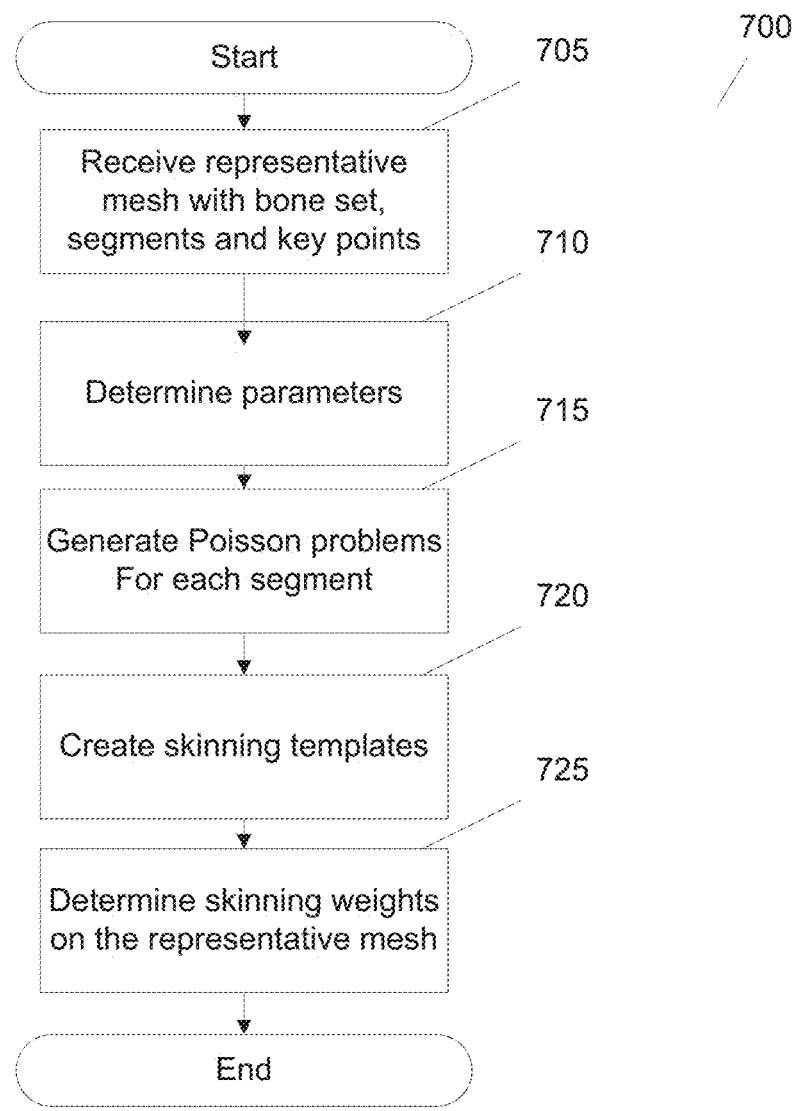
FIG. 7 illustrates a flow diagram of a process for determining skinning weights for a representative mesh in accordance with an embodiment of this invention.

A process for determining skinning weights for a representative mesh based and bone set using information concerning segments, and key points within the representative mesh in accordance with an embodiment of this invention is shown in FIG. 7. The process 700 receives (705) the representative mesh with segments, key points, and a bone set. The parameters of the skinning weights are determined (710). The parameters may be determined by a machine learning process, manually input by a user, or a combination of these processes. The parameters include, but are not limited to, a maximum and/or minimum number of bones that can influence a segment of the mesh, fall off constants for transition areas, and local optimization areas where the profile of the skinning weight is specific to a considered bone, such as in the hands and head of a character.

Poisson problems are then generated (715) for each segment. The Poisson problems may be generated by modeling each segment as a heat emitting body with the surrounding segments considered heat absorbing bodies. Specific coefficients and boundary conditions are used to capture the peculiarity of each segment/joint problem. These parameters may be estimated using machine learning processes or input by a user. The results of the Poisson problems provide skinning template profiles. Each skinning template profile is specific for a given joint and represents a typical spatial distribution of the skinning weights on a mesh. The skinning templates are then used to determine the skinning weights of the segments using a machine learning process (725) such as, but not limited to, Bayesian networks and in general Bayesian estimation.

The above is description of embodiments of systems and methods in accordance with the present invention. It is foreseen that other skilled in the art will design alternative systems that infringe on this invention as set forth in the following claims either literally or through the Doctrine of Equivalents.

We claim:

1. A method for automatic rigging three dimensional characters comprising:

generating a representative three dimensional mesh from a character mesh of a three dimensional character;

determining a plurality of segments by identifying interrelated areas of the representative three dimensional mesh;

identifying a plurality of key points within the representative three dimensional mesh;

generating a plurality of bones based on the plurality of segments and the plurality of key points, wherein bones of the plurality of bones connect together two or more segments of the plurality of segments within the representative three dimensional mesh;

determining skinning weights for the representative three dimensional mesh that define relationships between motion of the plurality of segments and the plurality of bones; and rigging the three dimensional character by mapping the plurality of bones and the skinning weights of the representative three dimensional mesh to the character mesh.

2. The method of claim 1, wherein generating the representative three dimensional mesh from the character mesh comprises generating a single interconnected mesh representing an outer geometry of the character mesh.

3. The method of claim 1, wherein determining the plurality of segments within the representative three dimensional mesh comprises probabilistically estimating the plurality of segments such that the plurality of segments provide boundaries between regions of the three dimensional character and provide smoothness.

4. The method of claim 3, wherein determining the plurality of segments further comprises utilizing a Conditional Random Fields process.

5. The method of claim 1, wherein determining the plurality of segments within the representative three dimensional mesh comprises determining ear segments, a nose segment, one or more hair segments, and one or more lip segments.

6. The method of claim 1, wherein identifying the plurality of key points within the representative three dimensional mesh comprises one or more of: receiving user identification of one or more key points, utilizing metadata, or performing a machine learning process.

7. The method of claim 1, wherein generating the plurality of bones comprises:

determining a number of bones;

determining sizes for the bones;

determining placements for the bones within the representative three dimensional mesh; and determining interconnection between the bones.

8. The method of claim 7, wherein generating the plurality of bones comprises utilizing a support vector machine to automatically generate and place the plurality of bones.

9. The method of claim 1, wherein determining the skinning weights for the representative three dimensional mesh further comprises:

determining parameters for the skinning weights;

using the parameters to generate a Poisson problem for segments of the plurality of segments by modeling a segment as a heat emitting body and modeling segments that surround the segment as heat absorbing bodies;

creating skinning templates by using the Poisson problem generated for each segment of and a machine learning process; and calculating the skinning weights from the skinning templates.

10. A system for automated rigging three dimensional characters, the system comprising:
at least one computing device configured to cause the system to:
generate a representative three dimensional mesh from a three dimensional character;
determine a plurality of segments within the representative three dimensional mesh;
identify a plurality of key points within the representative three dimensional mesh;
generate a plurality of bones based on the plurality of segments and the plurality of key points;
place the plurality of bones within the representative three dimensional mesh such that bones of the plurality of bones connect together two or more segments of the plurality of segments;
determine skinning weights for the representative three dimensional mesh based on placement of the plurality of bones and the plurality of key points; and
rig the three dimensional character by mapping the plurality of bones and the skinning weights of the representative three dimensional mesh to the three dimensional character.

11. The system of claim 10, wherein the at least one computing device is further configured to cause the system to generate the representative three dimensional mesh from the three dimensional character by generating a single interconnected mesh representing an outer geometry of the three dimensional character.

12. The system of claim 11, wherein the at least one computing device is further configured to cause the system to generate the representative three dimensional mesh from the character mesh by generating a visual hull of the outer geometry utilizing a volumetric method.

13. The system of claim 10, wherein the at least one computing device is further configured to cause the system to determine the plurality of segments within the representative three dimensional mesh by:
extracting features from the representative three dimensional mesh;
identifying estimated segments of the representative three dimensional mesh utilizing the features; and
determining the plurality of segments from the estimated segments utilizing a Conditional Random Fields process.

14. The system of claim 10, wherein the at least one computing device is further configured to cause the system to identify the plurality of key points within the representative three dimensional mesh by identifying mesh points located at a border between adjoining segments of the plurality of segments.

15. The system of claim 10, wherein the at least one computing device is further configured to cause the system to generate the plurality of bones by:
determining a number of bones;
determining sizes for the bones;
determining placements for the bones within the representative three dimensional mesh; and
determining interconnection between the bones.

16. The system of claim 10, wherein the at least one computing device is further configured to cause the system to rig the three dimensional character by:
associating vertices of a mesh of the three dimensional character with closest vertices in the representative three dimensional mesh; and
locally interpolating to derive skinning weights of the vertices of the mesh of the three dimensional character from the closest vertices in the representative three dimensional mesh.

17. A non-transitory computer-readable storage medium storing instructions that, when executed by at least one processor, cause a computing device to:
generate a representative three dimensional mesh from a character mesh of a three dimensional character;
determine a plurality of segments by identifying interrelated areas of the representative three dimensional mesh;
identify a plurality of key points within the representative three dimensional mesh;
generate a plurality of bones based on the plurality of segments and the plurality of key points, wherein bones of the plurality of bones connect together two or more segments of the plurality of segments within the representative three dimensional mesh;
determine skinning weights for the representative three dimensional mesh that define relationships between motion of the plurality of segments and the plurality of bones; and
rig the three dimensional character by mapping the plurality of bones and the skinning weights of the representative three dimensional mesh to the character mesh.

18. The non-transitory computer-readable storage medium as recited in claim 17, further storing computer-executable instructions that, when executed by the processor, cause the computing device to rig the three dimensional character by:
associating vertices of a mesh of the three dimensional character with closest vertices in the representative three dimensional mesh; and
locally interpolating to derive skinning weights of the vertices of the mesh of the three dimensional character from the closest vertices in the representative three dimensional mesh.

19. The non-transitory computer-readable storage medium as recited in claim 17, further storing computer-executable instructions that, when executed by the processor, cause the computing device to identify the plurality of key points within the representative three dimensional mesh by identifying mesh points located at a border between adjoining segments of the plurality of segments.

20. The non-transitory computer-readable storage medium as recited in claim 17, further storing computer-executable instructions that, when executed by the processor, cause the computing device to determine the plurality of segments within the representative three dimensional mesh by probabilistically estimating the plurality of segments such that the plurality of segments provide boundaries between regions of the three dimensional character and provide smoothness.

* * * * *